(No Model.)
J. G. SNYDER.
STRAW SEPARATOR AND CARRIER FOR THRASHING MACHINES.
No. 547,526. Patented Oct. 8, 1895.
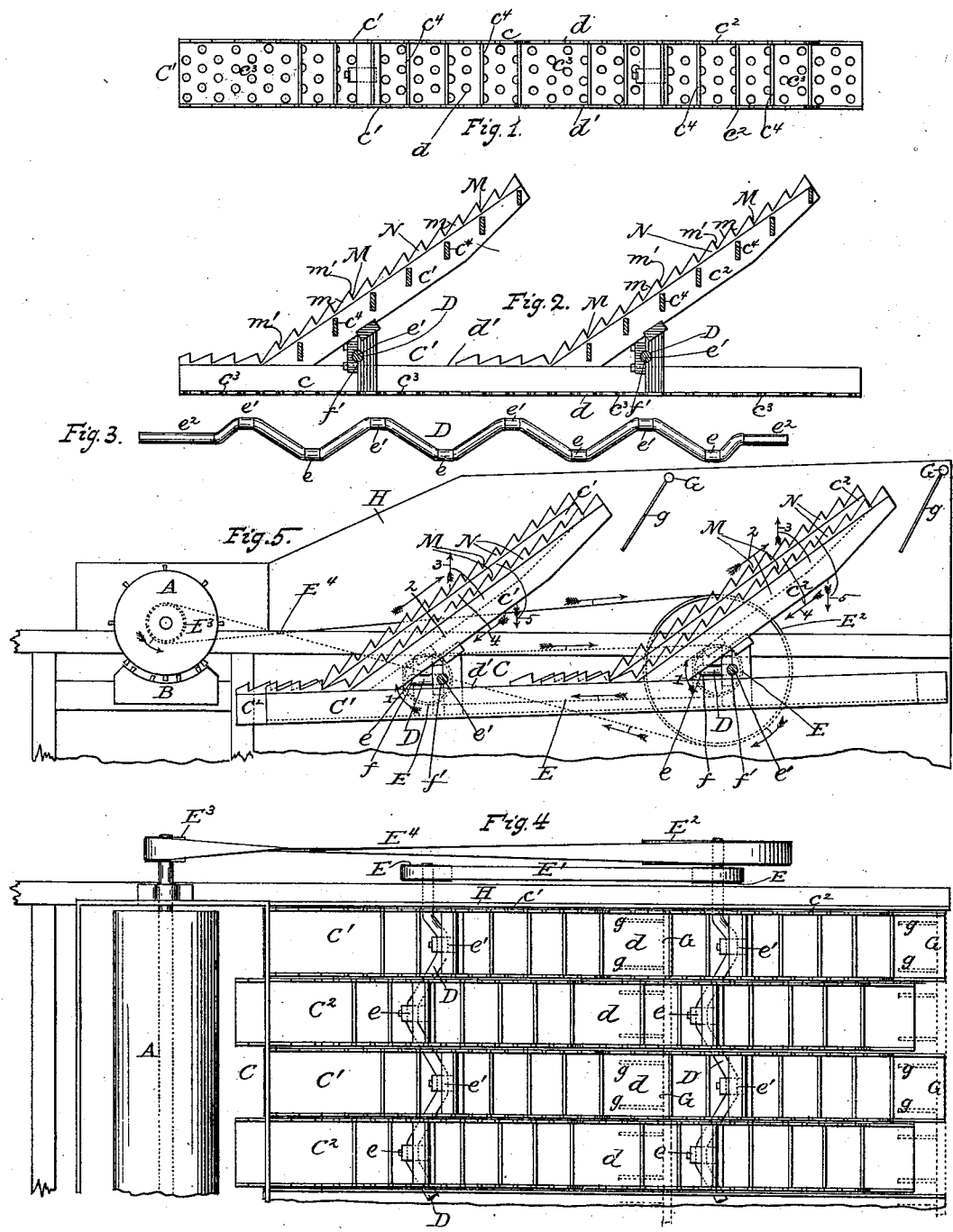
Witnesses. Charles Selkirk
A. Selkirk Jr.
John G. Snyder
Inventor
by Alex. Selkirk,
Attorney.

UNITED STATES PATENT OFFICE.

JOHN G. SNYDER, OF RAYMERTOWN, NEW YORK.

STRAW SEPARATOR AND CARRIER FOR THRASHING-MACHINES.

SPECIFICATION forming part of Letters Patent No. 547,526, dated October 8, 1895.

Application filed August 1, 1893. Serial No. 482,090. (No model.)

*To all whom it may concern:*

Be it known that I, JOHN G. SNYDER, a citizen of the United States, residing at Raymertown, in the county of Rensselaer and State of New York, have invented certain new and useful Improvements in Straw Separators and Carriers for Thrashing-Machines; and I do hereby declare the following to be a full, clear, and exact description of the invention, such as will enable others skilled in the art to which it appertains to make and use the same.

My invention relates to improvements in straw separators and carriers for thrashing-machines; and it consists of the combination of devices and parts hereinafter described, and set forth in the claims.

The object of my invention is to provide a simple mechanism by means of which the thrashed grain-straw may be continuously shaken and loosened while being gradually elevated to a considerable distance above the floor of the separator, and then be permitted to gradually fall to said floor in a loosened condition, to be again elevated to a considerable distance above the said floor while being shaken and loosened, and then be discharged from the rear of the machine, while the grain shaken from the straw may readily pass from the floor of the separator to below the same to be further operated with.

I attain these objects by the means illustrated in the accompanying drawings, forming a part of this specification, in which—

Figure is a plan view of one of the series of the grain separators and carriers containing my improvements. Fig. 2 is a longitudinal vertical section of the same. Fig. 3 is a view of the crank-shaft for operating the grain separators and carriers when assembled. Fig. 4 is a plan view of a thrashing-machine embodying my improvements, and Fig. 5 is an elevation illustrating the same.

The same letters of reference refer to similar parts throughout the several views.

In the drawings, A is the thrashing-cylinder and B is the coacting concave, both constructed and arranged in the framework of the machine, as heretofore practiced by the trade, together with the winnowing mechanism and other parts which are so well known as not to require any particular description.

C is the straw separator and carrier, which is made sectional and is composed of the several sections $C'$ $C^2$ and the multiple crank-shaft D for operating the said sections. These sections $C'$ $C'$ and $C^2$ $C^2$ are made of any suitable length and with a width each of about eight inches, more or less, according to the intended capacity of the machine, and are composed each of a horizontal body $c$ and duplicate inclined straw-carrying arms $c'$ $c^2$, arranged one rearward of the other and extending upwardly and rearwardly from the said body at an angle of between thirty and forty-five degrees inclination in relation to the horizontal line of the body $c$. The body $c$ of each of these sections is composed of the floor $d$, provided with perforations $c^3$ $c^3$, Figs. 1 and 2, and side guards $d'$ $d'$ at the outer edges of the said bodies $c$ and projected above the plane of the bottom or floor $d$ about four inches, more or less, and provided with the angularly-formed teeth $d^2$ $d^2$, as shown. This body $c$ of each of these sections $C'$ $C^2$ is extended from a point near to the thrashing-concave B rearwardly to such a distance as may be found best for the better separation of the grain from the straw. The inclined arms $c'$ $c'$ $c^2$ $c^2$ are arranged in parallel pairs, and they are each extended in direction upwardly and rearwardly from the upper edges of the respective side guards $d'$ $d'$, with which their lower ends are securely fixed, and are respectively connected, as shown in Fig. 2. The said inclined arms $c'$ $c'$ of the forward pair are connected together by suitable cross-bars $c^4$ $c^4$ by means of screws or bolts or known equivalent means, (not shown,) and the similar inclined arms $c^2$ $c^2$ of the rearward pair are also connected together by similar cross-bars $C^4$ secured by screws or bolts. These cross-bars $C^4$ are arranged, preferably, about at a uniform distance apart, as shown in Figs. 1 and 2, so as to produce passage-ways of about like width through which the grain shaken from the thrashed straw may freely pass downwardly to the perforated floor $d$ below. These inclined arms $c'$ $c'$ and $c^2$ $c^2$ are each provided with angular notches M M, having their upper sides $m$ $m$ made each with an incline, while their front sides $m'$ $m'$ are about vertical or nearly so. These notches alternate with teeth N, which teeth operate to catch into the straw and hold it from sliding back when a coacting adjoining section provided with similar inclined arms having similar notches and teeth is being moved in an opposite direction. The forwardly-inclined arms $c'$ of each section $C'$ $C^2$ have their foot ends suitably connected with the horizontal body $c$ of each at a point a short distance rearward of the concave B, while the rear and elevated end of the same is extended to a point on a vertical line drawn at a point at or about a little forward of the foot end of the rearward inclined arms $c^2$ $c^2$. The rearward arms $c^2$ are made, in form, dimensions, and angle of inclination, about the same as the forward arms $c'$, and the notches M M and teeth N are also substantially as the notches and teeth in the forward arms. Secured between the perforated floor $d$ of the body $c$ and the arms $c'$ $c^2$ are posts $d^3$ $d^3$ for stiffening said arms with said body and for receiving the bearings for the journals of the multiple crank-shafts, as will be hereinafter described. Although these teeth may be made of metal, yet preference is given to the use of wood. These sections $C'$ $C^2$ are arranged side by side, as shown in Fig. 4, and in such a manner that each may freely move between its neighboring sections when they are operated.

D D are crank-shafts of multiple character and are provided at intervals with journals $e$ $e'$. These crank-shafts are also provided with outer end journals $e^2$ $e^2$, suitably supported in bearings secured to the framework of the machine, and are revolved by suitable band-pulleys E E, banded together by band $E'$ and actuated by suitable pulleys $E^2$ $E^3$, the latter driving the former when secured to one of the shafts of the said pair of crank-shafts. The intermediate journals $e$ $e'$ run in bearings $f f'$, provided with the respective sections, as illustrated in Figs. 4 and 5, and secured to the posts $d^3$ $d^3$, Figs. 1 and 2.

When the thrashing-cylinder, which may be of any suitable form of construction, is revolved, pulley $E^3$ will, through band $E^4$, actuate pulley $E^2$, secured to one of the crank-shafts D, and revolve such shaft and the pulley E secured to it. Pulley E through band $E'$ revolves the other crank-shaft D, so that the two crank-shafts will be simultaneously revolved. With this simultaneous revolution of the two crank-shafts they will both be revolved in direction of arrows 1 1, Fig. 5, when the series of cranks carrying the journals $e$, having their bearings secured to sections $C'$, will be carried in direction first rearwardly and upwardly, as indicated by arrows 2 and 3, while the sections $C^2$ are being carried forwardly and downwardly, as indicated by arrows 4 and 5, until the respective sections $C'$ $C^2$ are each carried to their full elevation and distance rearwardly and the sections $C'$ to their full depressions and distance forwardly. Then sections $C^2$ will be raised and carried rearwardly and sections $C'$ will be depressed and carried forwardly. These motions of the said sections being continued, they will be alternately moved in the directions above described. A series of straw-checking fingers $g$ $g$ (shown by full lines in Fig. 5 and indicated by dotted lines in Fig. 4) are arranged rearward of the upper ends of the inclined arms $c'$ $c^2$ with their upper ends above the terminal points of the same. These fingers $g$ $g$ are set so as to incline downwardly and forwardly at any suitable angle, and are fixed, preferably, to the cross-bars G, which are suitably supported from stationary pieces or sides H of the machine. These straw-checking fingers $g$ $g$, carried by their respective cross-bars G, may be made to be capable of being adjusted in respect to their angles of inclination by any suitable means preferred. They are calculated to prevent the straw from being thrown to a distance rearward of the rear ends of said inclined arms and turn it downwardly immediately after its leaving the said arms, and these checking-fingers also cause the straw to fall in a loosened condition to the body of the separator below, while the upwardly-projected side guards $d'$ $d'$ prevent the straw from resting on the surface of the perforated floor $d$ of the section, thereby preventing the perforations $c^3$ $c^3$ of the floor $d$ from becoming stopped up or clogged. By these movements the thrashed straw delivered from between the thrashing-cylinder and its concave on the forward ends of the several sections $C'$ $C^2$ will be gradually elevated and carried rearwardly by the forward arms $c'$ $c'$ to fall down to the body of the separator, when the straw will again be progressively raised and carried rearwardly by the rear arms $c^2$ $c^2$ of the sections $C'$ $C^2$ until it is free from grain and delivered at the rear end of the machine. The movements of the said arms $c'$ $c^2$ in alternate directions also operate to loosen and so disturb the straw as to allow the grain to freely fall therefrom, while the checking-fingers $g$ $g$ direct the fall of the straw.

Having described my invention, what I claim, and desire to secure by Letters Patent, is—

1. In a straw-carrier and separator the combination of two series of horizontally reciprocating sections, each section of one series alternating with one of the other series, each of said sections consisting of a long narrow body $c$, perforated floor $d$, vertical side guards $d'$ $d'$, the upper edges of which are serrated pairs of parallel arms extending upwardly and rearwardly from the side guards, the upper edges of which are serrated, cross bars $c^4$ $c^4$, connecting the arms of each pair, posts between the arms and floor $d$ forming supports for the arms and bearings in each post for the multiple crank shaft whereby the sections are reciprocated, and means for operating the same, substantially as described.

2. In a thrashing machine, the combination with a straw carrier and separator composed of the alternating sections C' C² constructed and arranged as described and provided each with the two described pairs of inclined arms c' c² which are provided in their upper side edges with angular notches M, and teeth N, and the two revolving multiple crank shafts D D supporting and operating said sections as described, of the two series of straw checking fingers g g, supported at a short distance rearward of the rear ends of the arms c' c² of said sections C' C² substantially as and for the purposes set forth.

In testimony that I claim the invention above set forth I affix my signature in presence of two witnesses.

JOHN G. SNYDER.

Witnesses:
 ALEX. SELKIRK,
 A. SELKIRK, Jr.